(12) United States Patent
von Werder

(10) Patent No.: US 7,194,929 B2
(45) Date of Patent: Mar. 27, 2007

(54) POLE FOR HAND PALLET TRUCK

(75) Inventor: Martin von Werder, Ammersbek (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 372 days.

(21) Appl. No.: 10/725,252

(22) Filed: Dec. 1, 2003

(65) Prior Publication Data

US 2005/0126330 A1    Jun. 16, 2005

(51) Int. Cl.
*G05G 1/04*     (2006.01)
*G05G 5/06*     (2006.01)
*B62D 51/04*    (2006.01)
*B62T 1/00*     (2006.01)

(52) U.S. Cl. .................. 74/523; 180/19.1; 180/19.2; 180/332; 192/129 R; 188/21; 74/526; 74/527; 74/528; 74/529

(58) Field of Classification Search .............. 74/523, 74/526–529; 180/19.1, 19.2, 19.3, 333, 332; D34/35; 192/129 R; 188/21; *B62B 3/06, B62B 5/06; B66F 9/06*
See application file for complete search history.

(56) References Cited

U.S. PATENT DOCUMENTS

| 4,392,538 | A | * | 7/1983 | Goertzen | .................. | 180/19.1 |
| 4,573,543 | A | * | 3/1986 | Bataille | ..................... | 180/19.1 |
| 5,595,259 | A | * | 1/1997 | Gilliland et al. | ............ | 180/332 |
| 6,382,383 | B1 | * | 5/2002 | Schennach | .............. | 192/129 R |
| 6,883,625 | B2 | * | 4/2005 | Trego et al. | ............... | 180/19.2 |
| 2002/0092709 | A1 | * | 7/2002 | Kronewitter | ................. | 188/21 |

FOREIGN PATENT DOCUMENTS

| CH | 689929 A5 | * | 5/1992 |
| DE | 297 10 503 U1 | | 9/1997 |
| EP | 1 186 511 A2 | | 3/2002 |
| JP | 2002-59846 | * | 2/2002 |
| WO | WO 2004/067350 A1 | * | 8/2004 |

* cited by examiner

*Primary Examiner*—Vinh T. Luong
(74) *Attorney, Agent, or Firm*—Wall Marjama & Bilinski LLP

(57) ABSTRACT

A pole for a hand pallet truck that includes a pole bar which is linked to a support for a steerable wheel at its lower end and connected to a loop-shaped handle at the other end. An operating device is disposed within the space defined by the handle. The operating device is attached to a holding extension projecting into the handle in prolongation of the bar, and is connectable to a lifting apparatus of the hand pallet truck via a traction and/or pushing element. If applicable, it is connectable via a second traction and/or pushing element to a brake of the hand pallet truck, wherein an operating lever is disposed on either side of the extension. The operating levers are pivotally mounted on the holding extension in a plane essentially defined by the handle.

14 Claims, 4 Drawing Sheets

POLE FOR HAND PALLET TRUCK

FIELD OF THE INVENTION

This invention relates to a hand pallet truck.

BACKGROUND OF THE INVENTION

In conventional hand pallet trucks, a pole is used to steer and move the vehicle, as well as to pump for lifting a load. To operate the lifting apparatus, especially to lower the load, an operating element is required which should be easily accessible, and allow switching between the functions of lifting and driving as well as sensitive lowering of the load.

Easy accessibility of the operating element is especially important for effective operation of the hand pallet truck when pulling the vehicle, i.e. when the pole is an inclined position in front of the vehicle. By contrast, actuating the functions with an upright pole, i.e. when the vehicle is being pushed, is less important, because in most cases the vehicle is drawn out of the pallet, thereby returning the pole into the inclined position.

For pumping and moving the vehicle, it is advantageous if the pole handle is centrally grippable in order to avoid unnecessary steering as well as frictional forces. As the same time, the actuating forces at the operating element should be as small as possible in all situations requiring a longer actuating path, which might be realized by providing a longer distance between the circle point and the lever pivot point, for example.

It is known to use an extension of the pole bar traversing the handle as a mounting component for an operating lever extending to the sides. This known pole handle has the drawback that it cannot be gripped centrally. From DE 297 10 503 U1, it is further known to pivotally mount a control lever as the upper end of the portion of the bar extending into the handle. The lever must be pushed away from the operator to achieve a lowering of the load. Pulling the lever towards the operator will result in a switch to the lifting function. A drawback of this design is that the operator cannot actuate the functions well while pulling the vehicle because the control lever has to be pulled upwards to achieve a lowering action. Further, since the operating element is not familiar from other technical devices, it is less suitable for intuitive operation. The actuating forces are great due to the small distance between the circle point and the lever pivot point.

Apart from the above described possibility of operating a hand pallet truck, it is also common to provide it with an integrated handbrake. In this context, it is known from EP 1 186 511 A2 to pivotally mount an operating lever on either side of a holding extension traversing the handle of the pole in prolongation of the pole. One operating lever is connected to a traction or pushing element for the lifting apparatus and the other one with a traction or pressure element for a brake. Actuation of the lifting apparatus is effected such that pulling of the operating lever initiates a lowering operation in the lifting apparatus while pushing the lever opens up the possibility to effect a lifting operation by pumping on the pole. Pushing the other operating lever leads to braking of the vehicle wherein the extent of the pivotal movement determines the braking power. This known arrangement further provides for a locking/unlocking lever which is also pivotally mounted on the holding extension and has a projection cooperating with a recess of the brake operating lever when the brake operating lever has reached a given hind position. Thus, a parking brake is created which is released by pivoting the locking and unlocking lever in the opposite direction. Thereby the brake operation lever may return to its initial position by means of spring bias from the direction of the brake. Finally, the known arrangement also provides that the parking brake is released by actuating the other operating lever. In other words, when actuating the lowering operation, the parking brake is automatically released.

In the hand pallet trucks described above, the brake is usually optional. Depending on whether a brake is present or not, different handle arrangements have to be provided, thereby complicating the production process.

An object of the invention is to configure the pole head in a pole for a hand pallet truck such that it may optionally receive a brake operating device. When no brake is present, an especially ergonomic actuation of the lifting apparatus is desired.

SUMMARY OF THE INVENTION

According to the invention, the inside of the housing for the operating device is arranged identically, whether an integrated brake is provided or not. To this end, two identical mounting places are provided in the housing, on each of which an operating lever may be pivotally mounted. If a brake is integrated, one of the operating levers is a brake operating lever while the other lever actuates the lifting apparatus. If the brake is omitted, in general only one operating lever is required for operation. However, a coupling mechanism is provided in the inside of the housing allowing the provision of an identical operating lever on the other side for actuating the lifting apparatus. Hence, it is possible to drive the lifting apparatus either by actuating one or both operating levers at the same time, wherein movement in one direction initiates the lowering operation and a movement in the other direction initiates the lifting operation. As is ergonomically intuitive, pulling at one or the other or both operating levers initiates the lowering operation.

Therefore the invention allows to manufacture a pole head with operating device which is simple and constructed in an identical fashion, independent of whether a brake has to be actuated or not.

The invention also provides a particularly simple and effective design for the actuation of the traction or pushing element for the brake. To this end, an interlock portion with a toothing is disposed inside the housing and a catch is movably mounted on the brake lever and engages the toothing, whereby the brake lever can be locked in different pivotal positions. A blocking and unblocking lever also mounted within the housing of the operating device actuates the catch to disengage it from the toothing. The catch and/or the blocking and unblocking lever is biased by a spring. This solution of the invention has the advantage that the brake lever is self-locking over the entire actuating path in several defined positions up to the end position at maximal braking action, i.e. letting go off the brake lever in a certain position leads to the braking force being kept up. Since all actuation components apart from the actuating portions of the operating levers are disposed inside the housing, the design is optically appealing. In addition, the risk of parts being damaged and thereby becoming non-functional is reduced.

The actuating portion of the three possible operating levers may have the same shape or may be shaped differently. However, it is of advantage if—according to one embodiment of the invention—the material, the colour or the surface quality of the actuating portion for the brake lever differ from the corresponding properties of the other operating levers, so that the operator may recognize at first glance which lever is for braking and which lever is for actuating the lifting apparatus. A corresponding indication may also be achieved by differing shapes of the actuating portions.

The inner portions of the levers preferably cross each other, so that the pivot point for one operating lever is disposed on the opposite side of the axis extending in prolongation of the pole through the housing. In this way, high lever action may be achieved, i.e. a relatively great actuating force may be achieved with little expenditure of force.

BRIEF DESCRIPTION OF THE DRAWINGS

Further advantages of the invention shall become apparent from the following description in connection with the accompanying drawings, in which.

DETAILED DESCRIPTION

Figure 1:
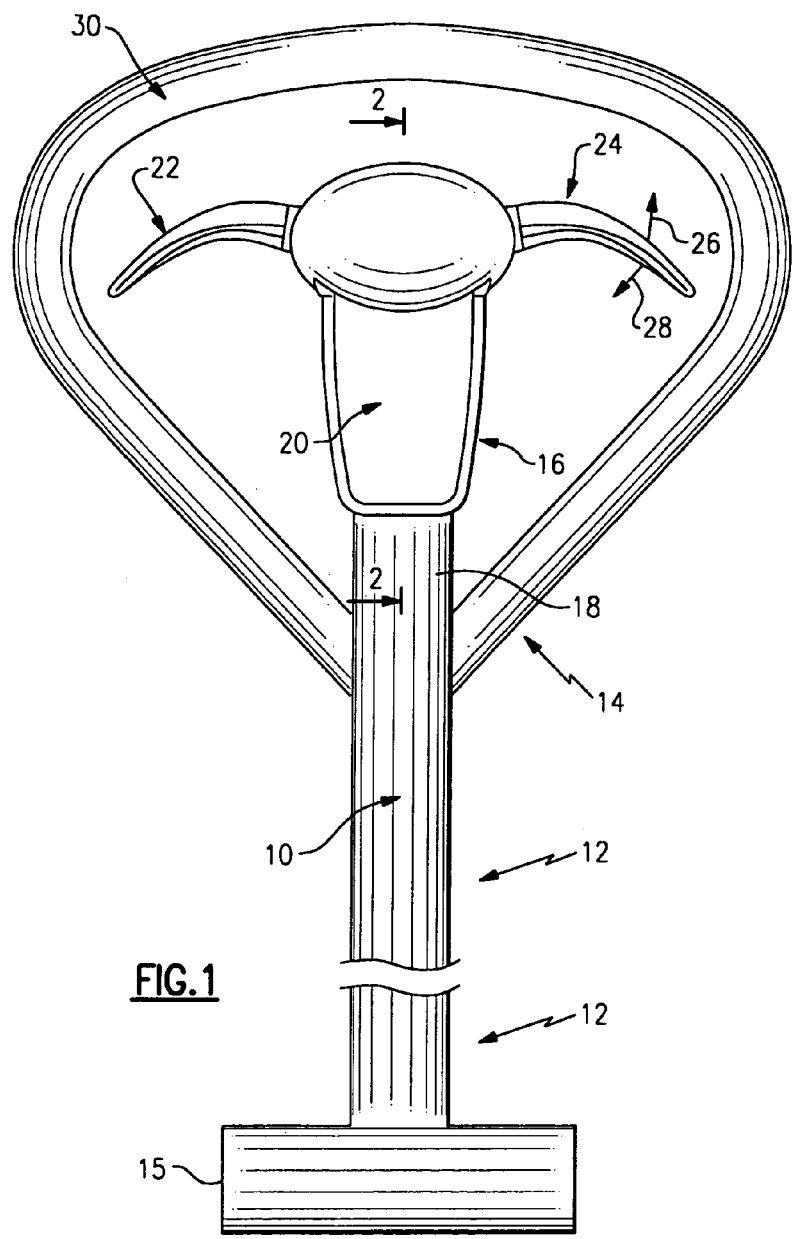
FIG. 1 shows a top view of a pole head of a hand pallet truck including an operating device according to the invention.

FIG. 1 shows a bar 10 of a pole generally indicated at 12. Only the section 10 and a loop-shaped handle 14 of the pole are fully shown. The other end of the pole bar 10 is connected or linked to the pillow block 15 (partially shown) of a steered wheel of a hand pallet truck (not shown) for the purpose of manipulating the hand pallet truck accordingly. As usual, the hand pallet truck includes a pump for lifting the load carrying means and a valve arrangement for lowering the load carrying means.

As usual, the handle 14 is formed by a suitably curved tube defining a plane in the axis of the bar 10 is also disposed. The bar 10 projects into the interior of the handle 14, thereby forming a holding extension 16. This holding extension comprises a tube section 18 and a housing 20 which have been mounted and fastened on the tube section 18. Details about this process will be described below.

In the housing 20, two operating levers 22, 24 are pivotally mounted for actuation of the lifting and lowering functions of the hand pallet truck (not shown). Details of these levers 22, 24 and their mountings are apparent from the further figures.

As shown by the arrows 26, 28, the levers 22, 24 may be pivoted in both directions in a plane coinciding with or parallel to the plane of the handle 14. Attention is drawn to the fact that the distance between the housing 20 or the extension 16 and the rear portion 30 of the handle 14 is such that the rear portion 30 of the handle 14 may be gripped by hand in any position.

Figure 2:
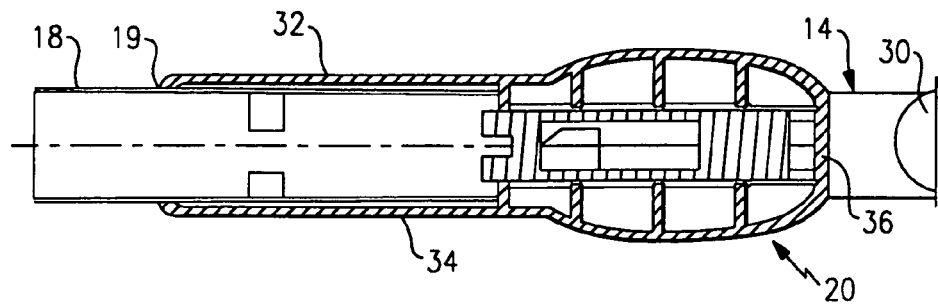
FIG. 2 shows a cross-sectional view through the device of FIG. 1 taken along line 2—2.

As shown in FIG. 2, the housing 20 consists of an upper shell 32 and a lower shell 34, the dividing plane 36 of the two shells 32, 34 being disposed in the central plane of the handle 14. The left part of the housing 20 is formed by a socket portion 19 receiving the tube section 18 in order to attach the housing 20.

Figure 3:
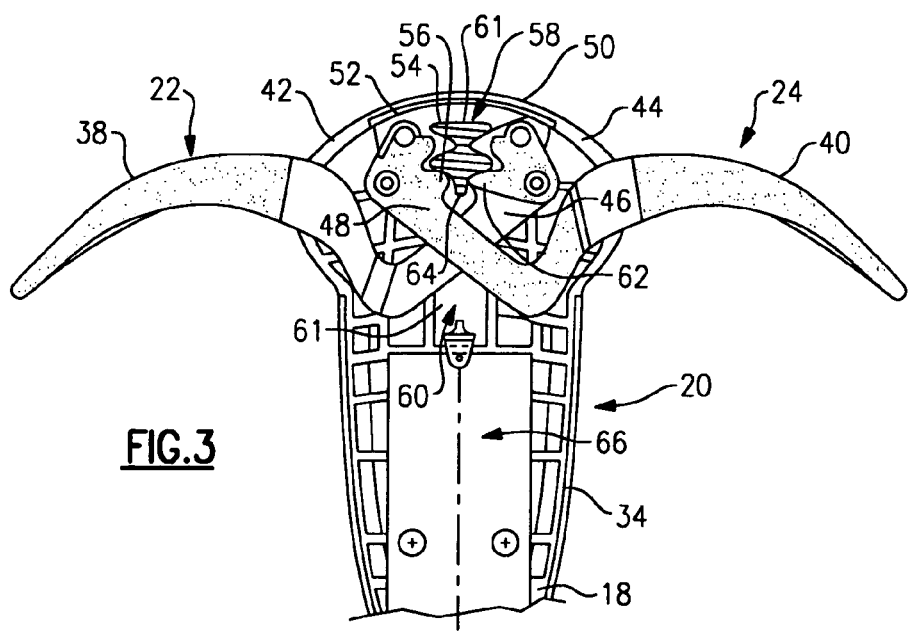
FIG. 3 shows a top view of a part of the pole head of FIG. 1 with the upper shell of the housing of the operating device removed.

As is apparent from FIG. 3 and the following figures, the two operating levers 22, 24 have the same slight S-form. The curved actuating portions 38, 40 of the operating levers 22, 24 each project through side slots 42, 44 in the housing 20 towards the outside. The curvature of portions 38, 40 is such that the convex sides face the operator and the concave sides face the pole bar 10, as is readily apparent from the drawings. The inner portions 46, 48 of the operating levers 22, 24 are curved in opposite directions and are pivotally mounted at pivot points 50, 52 in the housing 20, respectively. Mounting is effected, for example, by means of a bearing journal extending through a hole in either inner portion 46, 48. The holes are disposed nearly at the end of inner portions 46, 48.

The operating levers 22, 24 shown in FIG. 3 in the neutral position may be pivoted upwards, as well as downwards in FIG. 3. A stop to the pivotal movement is provided but not shown in detail.

As is apparent from FIG. 3 and the further figures, each inner portion 46, 48 of the operating levers 22, 24 has a toothed portion having two teeth 54, 56. The toothed portions of the two lever portion inner portions 46, 48 cooperate with a toothed rack 58 attached to a shifting element 60 which is mounted such that it is linearly movable in the axis of pole bar 10 in the housing 20, therein providing a coupling mechanism 61. The toothed rack portion 58 includes two teeth 62, 64 on each of its opposing sides, which cooperate with the corresponding teeth 54, 56 of inner portions 46, 48, of the operating levers 22, 24, respectively.

A traction rope 66 is attached to the opposite end of the shifting element 60 and is therefore connected to the coupling mechanism 61, the traction rope being in turn connected to corresponding control devices (not shown) provided in the hand pallet truck.

Referring to FIG. 3, the function of the lever mechanism for actuating the traction rope 66 shown in the figures will now be explained.

Figure 4:
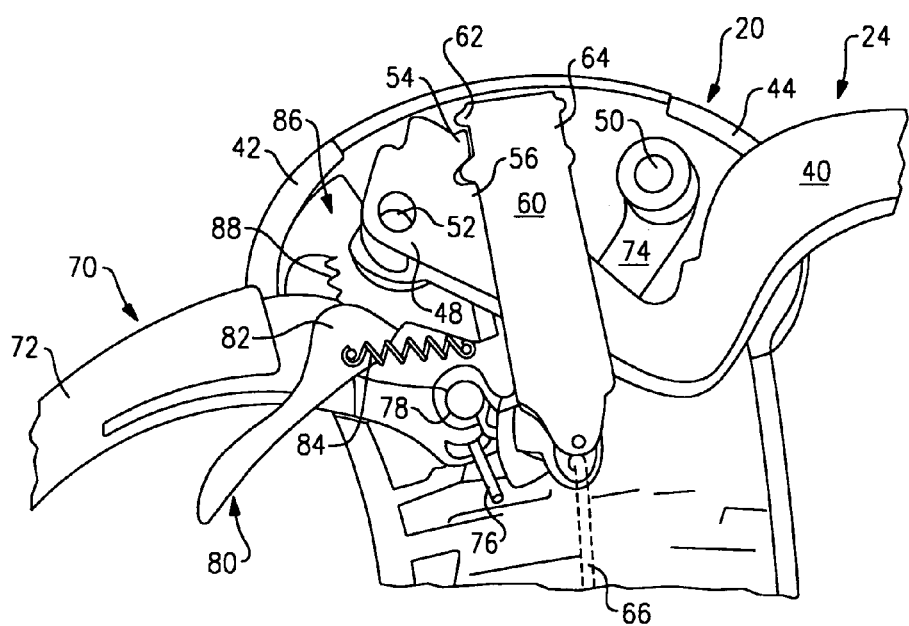
FIG. 4 shows a perspective view similar to that of FIG. 3, but including a brake operating lever.

If a lever is pivoted in the direction of arrow 24, i.e. towards the operator or rear portion 30, as shown in FIG. 4, the toothed rack 58 will be displaced by tooth 56 in the direction of the operator. This causes traction rope 66 to perform a traction movement, the displacement being indicated by the distance d between the broken and full lines in FIG. 4. The broken line indicates the neutral position as shown in FIG. 3. It is apparent that the same operation is achieved when both operating levers 22, 24 are pulled. If one lever is pulled further than the other, the displacement of the lever pulled furthest is decisive. The extent of deflection of the traction rope 66 determines the lowering speed of the load carrying means of the hand pallet truck (not shown).

If the pulled lever is released, it returns to the neutral position according to FIG. 3 by means of a suitable restoring device. For this purpose, spring means may be provided in suitable positions. It is also conceivable to lock the levers 22, 24 lightly in the neutral position in order to prevent a slight touch from triggering a function.

The operating lever 22 remains in its neutral position when the operating lever 24 is being pivoted for the purpose of triggering a lowering function. With respect to the lowering function, the operating levers 22, 24 are independent.

If a lever 22 or 24 is being pushed, i.e., pivoted away from the operating person, the shifting element 60 will be pushed in the same direction. This pushing initiates a lifting function. The displacement of traction rope 66 relative to the neutral position is indicated at d'. Lifting of the load carrying means may now be effected by "pumping" using the pole bar 10.

Teeth 56, 56 engage the toothing of toothed rack portion 58 such that a displacement of the toothed rack portion 58 caused by an actuation of one lever leads to pivoting of the other lever as well. Actuating one operating lever 22, 24 in the direction away from the operator therefore leads to synchronous displacement of both levers. Hence, it would also be possible to actuate both levers. Due to this synchronous displacement, the operator may recognize the operating position of the actuating device.

It may happen that one operating lever is being pulled and the other one is being pushed. As is apparent from the drawings, this will activate the function corresponding to the lever on which the greatest force is exerted.

However, if one operating lever 24 is being pulled, pushing the operating lever 22 is not possible because this lever 22 will be blocked by lever 24 through an interlocking of teeth.

As far as the same parts as in FIG. 3 are shown in FIG. 4, the same reference signs are used. It is apparent that, with respect to FIG. 3, the second operating lever 22 has been removed and in its place an operating lever 70 including an actuating portion 72 and an inner portion 74 has been provided. The inner portion 74 is pivotally mounted at the same mounting place 50 where, in the embodiment of FIG. 3, the operating lever 22 was pivotally mounted. The housing 20 is arranged such that the operating lever 22 may easily be replaced by the operating lever 70 and vice versa. The actuating portion 72 may have the same geometry as the actuating portion 38 of FIG. 3, alternatively it may be shaped differently or have a different surface or color so that the operator may distinguish between operating levers 24 and 70 with respect to their function.

As is also apparent from FIG. 4, a brake rope 76 is attached to a middle portion of the operating lever 70 at 78. Pulling the operating lever 70 causes actuation of the brake of the hand pallet truck (not shown). The brake rope 76 is preferably accommodated in the tubular pole bar (not shown).

As further shown in FIG. 4, inner portions 48 and 74 of levers 24, 70, respectively, extend through the shifting element 60 in order to cross there. Only the lower part of the shifting element 60 may be seen in FIG. 3. This has no bearing on the function, other than that the operating levers 24, 70 also cross there in order to be able to achieve a great lever force.

The third lever acting as locking and unlocking lever 80 is pivotally mounted at 82 on operating lever 70. For this purpose, lever 70 is reduced in thickness in the mounting area, so that the locking and unlocking lever 80 may also project through the slot 42 of housing 20. A spring 84 urges or biases the lever 80 in a counterclockwise direction. The other end of the spring 84 is fixed at lever 70.

Inside the housing 20 a plate-shaped interlock portion 85 is disposed, the portion having a saw tooth arrangement 88. This portion 86 may be removable in the event a brake actuation is not desired.

Figure 5:
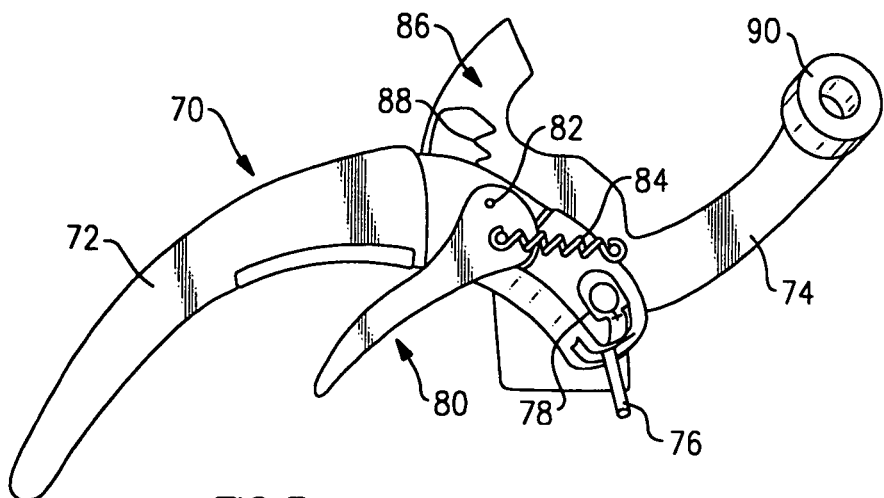
FIG. 5 shows the brake operating lever of FIG. 4 including an interlock portion.
Figure 6:
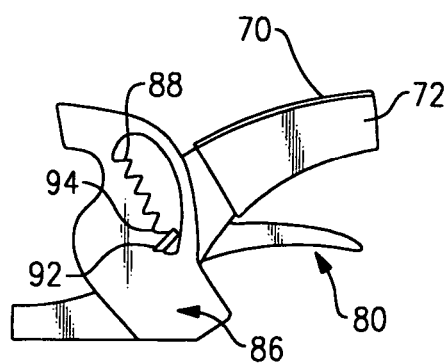
FIG. 6 shows the bottom view of the brake operating lever of FIG. 5 and the interlock portion.

FIG. 5 merely indicates a bearing bush 90 of the inner portion 84 of lever 70 for mounting at pivot point 50 according to FIG. 4.

A catch 92 is mounted on the same shaft as the locking and unlocking lever 80 on lever 70. A pivot point is indicated at 94. Due to the bias of the locking and unlocking lever 80, the catch 92 is always pivoted against toothing 88, so when pulling at operating lever 70, the catch 92 ratchets along the toothing 88 and lockingly engages the tooth space to which the catch 92 is aligned at the moment when the pivotal movement of lever 70 is ended. The operating lever 70 may therefore be locked in several positions to keep the braking force constant at the set value. The operator may unlock the lock by actuating the locking and unlocking lever 80 and pivoting it in clockwise direction in FIG. 5. This causes the catch 92 to pivot in the counterclockwise direction and disengage with the toothing 88. The spring of the brake may return the operating lever 70 to its original position.

In the housing 20, appropriate stops to limit the displacement of the operating levers may be provided.

The invention claimed is:

1. A pole for a hand pallet truck comprising:
   a pole bar linked to a support for a steerable wheel at a lower end and connected to a loop-shaped handle at an opposite end,
   an operating device within a space defined by the loop-shaped handle, said operating device being attached to a holding extension projecting into the handle in prolongation of the pole bar, and connectable to a lifting apparatus of the hand pallet truck via a first traction and pushing element, and connectable via a second traction and pushing element to a brake of the hand pallet truck,
   a first operating lever and a second operating lever respectively disposed on either side of the holding extension, each of said first and second operating levers being pivotally mounted on the holding extension in a plane essentially defined by the handle,
   wherein the operating device includes a housing, in which first and second mounting places are disposed, one for each of said first and second operating levers, each of said first and second operating levers projecting through a slot in a side of the housing with an actuating portion, in that the first and second mounting places are identically constructed and are symmetrically arranged to the axis of the holding extension, wherein said first operating lever is mounted at the first mounting place and one of said second operating lever and a third operating lever is mounted at the second mounting place, wherein and when said second operating lever is mounted at the second mounting place, the second operating lever is connected with the second traction and pushing element for the brake, in that the first and third operating levers are identically shaped and each have a an inner portion, in that a coupling mechanism connected to the first traction and pushing element is disposed inside the housing, wherein the coupling mechanism is constantly engaging the inner portion of the first operating lever and engages the inner portion of the third operating lever when said third operating lever is mounted at the second mounting place, and wherein a locking device for the second operating lever is further provided in said housing, wherein said locking device is actuated from a locking and unlocking lever mounted at a third mounting place and extending to the same side as the one of said second and third operating levers.

2. The pole of claim 1, wherein the first and third operating levers are coupled by the coupling mechanism such that pulling at least one of the first and third operating levers out of a neutral position and away from the pole bar causes a lowering operation and pushing one of said first and third operating levers out of the neutral position towards the pole bar allows a lifting operation of the lifting apparatus.

3. The pole of claim 1, including a toothed interlock portion disposed in the housing (20) and a catch for engaging with the teeth of said interlock portion such that when pulling the second operating lever, the catch ratchets along the teeth of said interlock portion and, when the second operating lever has finished moving, said lever engages one of the tooth spaces, said locking and unlocking lever being coupled to the catch to disengage said catch from the teeth.

4. The pole of claim 3, wherein at least one of the catch and the locking and unlocking lever is biased by a spring.

5. The pole of claim 3, wherein the catch and the locking and unlocking lever are each mounted on the second operating lever.

6. The pole of claim 1, wherein each of the first, second and third operating levers have the same geometric shape.

7. The pole of claim 1, wherein the actuating portion of the second operating lever is different than the actuating portions of the first and third operating levers, wherein said actuating portion of second operating lever has a different feature including at least one of being made from a different material, having a different surface and/or a different color and having a different shape than the first and third operating levers.

8. The pole of claim 1, wherein one of the operating levers remains in the neutral position when the other of said operating levers is being pulled.

9. The pole according to claim 8, wherein shifting the operating levers between a pushing direction and back to the neutral position moves the operating levers synchronously.

10. The pole of claim 1, wherein the coupling mechanism includes a shifting element which is linearly movable inside the housing and has a tooth rack portion with teeth on opposing sides and wherein the first and third operating levers each have a toothed portion for engaging with said teeth of the tooth rack portion.

11. The pole of claim 10, wherein inner end portions of the operating levers cross each other inside the housing and their mounting places are disposed on respective opposite sides of the shifting element.

12. The pole of claim 1, wherein the housing is made up of two shells, the dividing plane of which is disposed in or parallel to the pivotal plane of the operating levers.

13. The pole of claim 12, wherein each of the housing shells has a socket portion which is capable of receiving a tube portion of the holding extension.

14. A pole for a hand pallet truck comprising:
  a pole bar linked to a support for a steerable wheel at a lower end and connected to a loop-shaped handle at an opposite end,
  an operating device disposed within the space defined by said loop-shaped handle, the operating device being attached to a holding extension projecting into the handle in prolongation of the pole bar,
  first and second operating levers disposed on either side of the holding extension, each of said operating levers being pivotally mounted on the holding extension in a plane essentially defined by the handle, wherein said first operating lever acts on a traction or pushing element connectable to a lifting apparatus of the hand pallet truck and said second operating lever acts on a second traction or pushing element connected to the brake of the hand pallet truck and a locking and/or unlocking lever pivotally mounted inside the operating device which in a first position of the second operating lever locks said second operating lever and in a second position unlocks the second operating; and
  a catch movably mounted on the second operating lever inside the housing for the operating device, said catch cooperating with a toothed interlock portion in the housing to lock the second operating lever in given pivotal positions, in that the locking and unlocking lever is tiltably mounted inside the housing and coupled to the catch and that at least one of the catch and the locking and unlocking lever is biased by a spring.

* * * * *

UNITED STATES PATENT AND TRADEMARK OFFICE
CERTIFICATE OF CORRECTION

| | |
|---|---|
| PATENT NO. | : 7,194,929 B2 |
| APPLICATION NO. | : 10/725252 |
| DATED | : March 27, 2007 |
| INVENTOR(S) | : Martin von Werder |

It is certified that error appears in the above-identified patent and that said Letters Patent is hereby corrected as shown below:

Column 1, line 25, change "As" to --At--; line 36, change "as" to --at--.
Column 2, line 1, change "operation" to --operating--.
Column 4, line 25, delete "lever portion"; line 41, change "24" to --26--.
Column 5, line 53, change "42" to --48--; line 56, change "85" to --86--.
Column 6, line 46, change "a an inner" to --an inner--; line 67, delete "(20)".
Column 8, line 27, change "operating; and" to --operating lever; and--.

Signed and Sealed this

Twenty-ninth Day of May, 2007

JON W. DUDAS
*Director of the United States Patent and Trademark Office*